(12) United States Patent
Keller

(10) Patent No.: US 10,710,483 B2
(45) Date of Patent: Jul. 14, 2020

(54) ARMREST

(71) Applicant: GRAMMER AG, Amberg (DE)

(72) Inventor: Hubert Keller, Amberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/328,138

(22) PCT Filed: Feb. 9, 2016

(86) PCT No.: PCT/DE2016/000039
§ 371 (c)(1),
(2) Date: May 25, 2017

(87) PCT Pub. No.: WO2016/127970
PCT Pub. Date: Aug. 18, 2016

(65) Prior Publication Data
US 2017/0334324 A1 Nov. 23, 2017

(30) Foreign Application Priority Data

Feb. 10, 2015 (DE) .......................... 10 2015 001 551

(51) Int. Cl.
*B60N 2/75* (2018.01)
*B60N 2/427* (2006.01)
*F16C 11/10* (2006.01)

(52) U.S. Cl.
CPC ............. *B60N 2/767* (2018.02); *B60N 2/427* (2013.01); *B60N 2/753* (2018.02); *F16C 11/10* (2013.01)

(58) Field of Classification Search
CPC .......... B60N 2/75; B60N 2/763; B60N 2/767; B60N 2/77; B60N 2/773; B60N 2/777;
(Continued)

(56) References Cited

U.S. PATENT DOCUMENTS

| | | | | |
|---|---|---|---|---|
| 2,249,849 A | * | 7/1941 | Owler | .................... A47C 7/543 297/113 |
| 4,097,088 A | * | 6/1978 | Meiller | .................... B60N 2/77 297/411.38 |

(Continued)

FOREIGN PATENT DOCUMENTS

| | | |
|---|---|---|
| DE | 4022840 C1 | 1/1992 |
| DE | 19915469 A | 10/2000 |
| DE | 102006048107 A | 4/2008 |

*Primary Examiner* — Kyle J. Walraed-Sullivan
(74) *Attorney, Agent, or Firm* — Andrew Wilford

(57) ABSTRACT

The invention relates to an arm rest, in particular for a vehicle seat, comprising a support arm (12), which can be pivoted about a pivot axis (a1) between at least one use position and at least one non-use position, and which by means of a locking device (19) that can be moved between a locking position and a release position can be locked in at least one position. First retaining means (21) are assigned to the support arm (12), which can releasably be brought into engagement with second retaining means (22) that are connected to the vehicle structure, in order to lock the movement of the support arm (12) in at least one direction (u2) and in at least one locking position. The invention is characterized in that the locking device (19) comprises at least one lever (13) that interacts with the support arm (12), which relative to the support arm (12) is movably mounted, wherein the lever (13) is provided with the first retaining means.

7 Claims, 11 Drawing Sheets

(58) Field of Classification Search
CPC .... B60N 2/4633; B60N 2/4606; B60N 2/753;
A47C 7/54; A47C 7/543; A47C 7/768;
A47C 7/70; B64D 11/0644
USPC ........................................ 297/411.32, 411.38
See application file for complete search history.

(56) References Cited

U.S. PATENT DOCUMENTS

| | | | |
|---|---|---|---|
| 4,125,287 A | 11/1978 | Paulisch | |
| 4,165,901 A * | 8/1979 | Swenson | A47C 1/03 |
| | | | 297/411.33 |
| 4,244,623 A * | 1/1981 | Hall | A47C 1/03 |
| | | | 297/411.36 |
| 4,496,190 A * | 1/1985 | Barley | B60N 2/767 |
| | | | 297/411.38 |
| 4,828,323 A * | 5/1989 | Brodersen | B60N 2/77 |
| | | | 297/411.36 |
| 4,886,317 A * | 12/1989 | Konzmann | B60N 2/767 |
| | | | 297/411.39 |
| 4,978,170 A * | 12/1990 | Pelz | B60N 2/767 |
| | | | 297/411.39 |
| 5,033,792 A * | 7/1991 | Kanazawa | B60N 2/753 |
| | | | 297/411.32 |
| 7,195,312 B2 | 3/2007 | Crossman | |
| 8,684,463 B2 * | 4/2014 | Rumler | B60N 2/757 |
| | | | 297/359 |
| 2005/0200186 A1 * | 9/2005 | Schumacher | B60N 2/3047 |
| | | | 297/411.38 |
| 2006/0119160 A1 * | 6/2006 | Ruspa | B60N 2/242 |
| | | | 297/411.32 |
| 2015/0375865 A1 * | 12/2015 | Fischer | B60N 2/919 |
| | | | 701/49 |

\* cited by examiner

ARMREST

CROSS REFERENCE TO RELATED APPLICATIONS

This application is the US-national stage of PCT application PCT/DE2016/000039 filed 9 Feb. 2016 and claiming the priority of German patent application 102015001551.6 itself filed 10 Feb. 2015.

FIELD OF THE INVENTION

The invention relates to an armrest, in particular for a vehicle seat.

An armrest is known from DE 199 15 469 that is mounted on a base and pivotal about an axle fixed to the seat. A segment gear having teeth is fixed to the armrest. The segment teeth cooperate with a ratchet fixed to the seat in order to lock the armrest in predetermined positions. The spacing of the segment teeth from the pivot axis is only slightly less than the spacing of the pivot axis from a bearing point of the armrest. This otherwise advantageous armrest can be further improved since the segment body occupies considerable space.

OBJECT OF THE INVENTION

The object of the invention is therefore to provide an armrest having a latch system that securely holds the armrest in the set position even when holding forces are great. The problem addressed by the invention is also that of creating an armrest that requires little space despite being able to withstand considerable holding forces. In addition, another object of the invention is to provide an armrest that maintains a low noise level for the vehicle occupant.

SUMMARY OF THE INVENTION

This problem is addressed by an armrest comprising a support arm mounted to allow pivoting about a pivot axis relative to a fixed structure—for example a base fixed to the vehicle structure—between at least one use position and at least one non-use position of the structure. The support arm is latchable against movement out of at least one position in at least one direction by a latch that can be moved between a locking position and a release position.

The latch includes at least one lever adapted to transmit forces from the support arm to the structure. The lever can be connected to the support arm for example. The support arm can be supported by the lever in for example, at least one position or in at least one relative position with respect to the lever.

The lever is equipped with first latch formation that can be brought into a reversible engagement with second latch formation that are connected to the structure, in particular the vehicle structure, in order to lock pivoting of the lever in at least one locking position and one direction.

"Lock in at least one direction" means, in the context of the invention, that pivoting of the lever is, for example, prevent by the latch in one direction but is possible in a second direction. The first and the second latch formation form for example, a freewheel and a non-return device. According to an alternative embodiment, pivoting of the lever can also be locked in both pivot directions. The lever is latchable in one pivot position or in multiple pivot positions. The lever is mounted to enable movement relative to the support arm.

The lever makes it possible to space the latch far from the pivot joint of the support arm. Due to the large lever arm, great holding forces can be achieved. Nevertheless, according to the invention, it is possible to minimize the constructed space of the armrest, since the lever does not join in the pivot motion over the entire pivoting range of the support arm in the same position relative to the support arm. Moreover, the noises caused by the latch, such as the ratcheting of the teeth, are more difficult for the vehicle occupant to hear.

The lever is pivotal, for example by a hinge. The lever can form a pivot joint with the support arm, for example. According to an alternative embodiment, the lever forms for example a pivot joint with the base. In this way, the lever is pivotable about a pivot axis and can move relative to the support arm along a pivot path.

Pivoting of the support arm and pivoting of the lever are coupled, for example in at least one rotational angle range of the support arm. The movement coupling can be implemented for example, a spring that biases the lever in a predetermined pivot direction. The support arm and the lever assume, for example, in the angular range, a defined relative position with respect to each other. In at least one relative position of the support arm to the lever, forces of the support arm can be transmitted to the lever.

According to one embodiment, pivoting of the lever is limited by at least one first stop. The first stop is fixed to the vehicle for example. It can be fixed directly or indirectly to the base, for example. In this way, pivoting of the support arm can be decoupled from pivoting of the lever. The support arm and the lever move in the same direction with for example, an unchanged relative position to each other, until the lever engages the first stop. Thereafter, the motion is decoupled for example, and the support arm can be pivoted further in the same direction of movement, while the lever is restricted in its degree of freedom by the first stop. After the decoupling, the relative position between the support arm and the lever can change, for example.

Pivoting of the support arm can also be limited for example, by at least one second stop fixed to the structure—for example fixed to the vehicle. At least one end position of the support arm can, for example, be defined by the second stop. The second stop can be constructed on the base, for example.

According to one embodiment of the invention, pivoting of the support arm is limited relative to the lever in at least one pivot direction by at least one third stop. In this way, the degree of freedom of pivoting of the lever can be restricted relative to the support arm. If a predetermined minimum angle between the support arm and lever is reached, the support arm can be supported on the lever, for example. However, it is also possible for example, to set a greater angle between support arm and lever. Pivoting of the support arm relative to the lever is optionally limited at a maximum tilt angle by a stop.

A spring biases the lever, for example in a first direction. The spring biases the lever in contact with the first stop, for example. The spring is held, for example, against the lever and against the structure, in particular the vehicle structure, for example on the base.

By way of example, the latch is designed in such a manner that the lever, when in the locking position, can move freely in a first pivot direction, and is blocked in a second pivot direction. This one-way coupling enables the support arm, when in the locking position, to move in one direction, but to be locked in a different direction. The support arm can, for example with respect to an upward movement in the direction of the non-use position, be freely pivotable, but with respect to a downward movement toward the use position be locked. The one-way coupling is formed, for example, between the first latch formation and the second latch formation.

According to an alternative embodiment, the latch is designed in such a manner that the lever, when in the locking position, is locked in both pivot directions.

According to one embodiment of the invention, the first and/or the second latch formation are formed by a tooth structure that has retaining surfaces. The retaining surfaces can block the movement of the other latch formation in at least one direction. The tooth structure can include, for example, shallow flanks and steep flanks where the shallow flanks allow relative movement of the latch formation in a first direction, and wherein the steep flanks prevent a relative movement of the latch formation in a second direction. The retaining surfaces can be functionally assigned to at least one locking seat.

The second latch formation is provided on, for example, a movably mounted locking formation. The locking formation can form, for example, a lever pivotal about a pivot axis. The locking formation includes, for example, at least one locking seat with at least one locking surface, which prevent a movement of the first locking means in at least one direction.

The first latch formation and the second latch formation can be moved out of engagement and/or into engagement according to their relative position by, for example, a controller. For example, the latch formation in a first end position relative to each other are moved out of engagement, and in a second end position relative to each other are moved into engagement. The armrest has, for example, a controller that controls whether, according to the relative position of the first latch formation to the second latch formation, the first latch formation are moved into engagement or out of engagement. According to an alternative embodiment, the first and second latch formation can also be moved into and/or out of engagement by a handle.

According to an embodiment, a memory device is provided that can move between a holding position and a freeing position, being blocked in the selected locking position when the lever is in the holding position in which the lever is not locked in the release position. The lever can be entirely prevented from moving by the memory device, for example. In this manner, a movement of the lever in which the lever is free to move normally can also be prevented. With a free wheel or a one-way coupling, both directions are blocked, for example.

Also, the movement of the latch formation into an end position in which the latch formation move out of engagement can be avoided by the memory device. If the memory device is in the holding position, the support arm can be moved—for example into the vertical position—and then returned directly to the previously set position. This can be advantageous, for example, if there is a compartment under the support arm. In this case, the set position is maintained even if the user pivots the support arm upwards for access to the compartment.

The memory device has, for example, third latch formation. The third latch formation is provided on a third lever for example. The third lever is mounted, for example, for pivoting about a pivot axis. It can be mounted on the base, for example. The third latch formation comprise, for example, at least one retaining surface able to prevent a movement of the lever in at least one direction—that is, for example, in a pivot direction or, for example, in two opposite pivot directions.

The memory device can, for example by a handle, be movable into the holding position and/or into the freeing position.

The memory device includes, for example, a controller, by means of which the memory device is held after actuation in the holding position, until the support arm has executed a specific movement. For example, the memory device remains in the holding position until the support arm has been pivoted through a predetermined angle in a first direction, and then pivoted back in a second direction into the starting position.

BRIEF DESCRIPTION OF THE DRAWING

Further advantages of the invention will be apparent from an embodiment shown in the schematic figures in which.

SPECIFIC DESCRIPTION OF THE INVENTION

The armrest as a whole is indicated in the figures at 10. Like reference numbers in the different figures refer to the same parts, even if lower-case letters are added or omitted.

The armrest 10 is part of a vehicle and comprises a base 11 fixed to the vehicle, a support arm 12, and a lever 13. An arm support is fixed to the support arm 12 in a manner not shown, such that the arm of a vehicle occupant can be supported on an upper surface SO of the support arm 12. The support arm 12 is pivotal on the base 11 about a pivot axis $a_1$ in directions $u_1$ and $u_2$, and forms with the base 11 a pivot joint $G_1$. The lever 13 is pivotal on the support arm 12 about a pivot axis $a_2$ in directions $v_1$ and $v_2$, and forms with the support arm 12 a pivot joint G2. The pivot axes $a_1$ and $a_2$ are spaced from each other.

Figure 8:
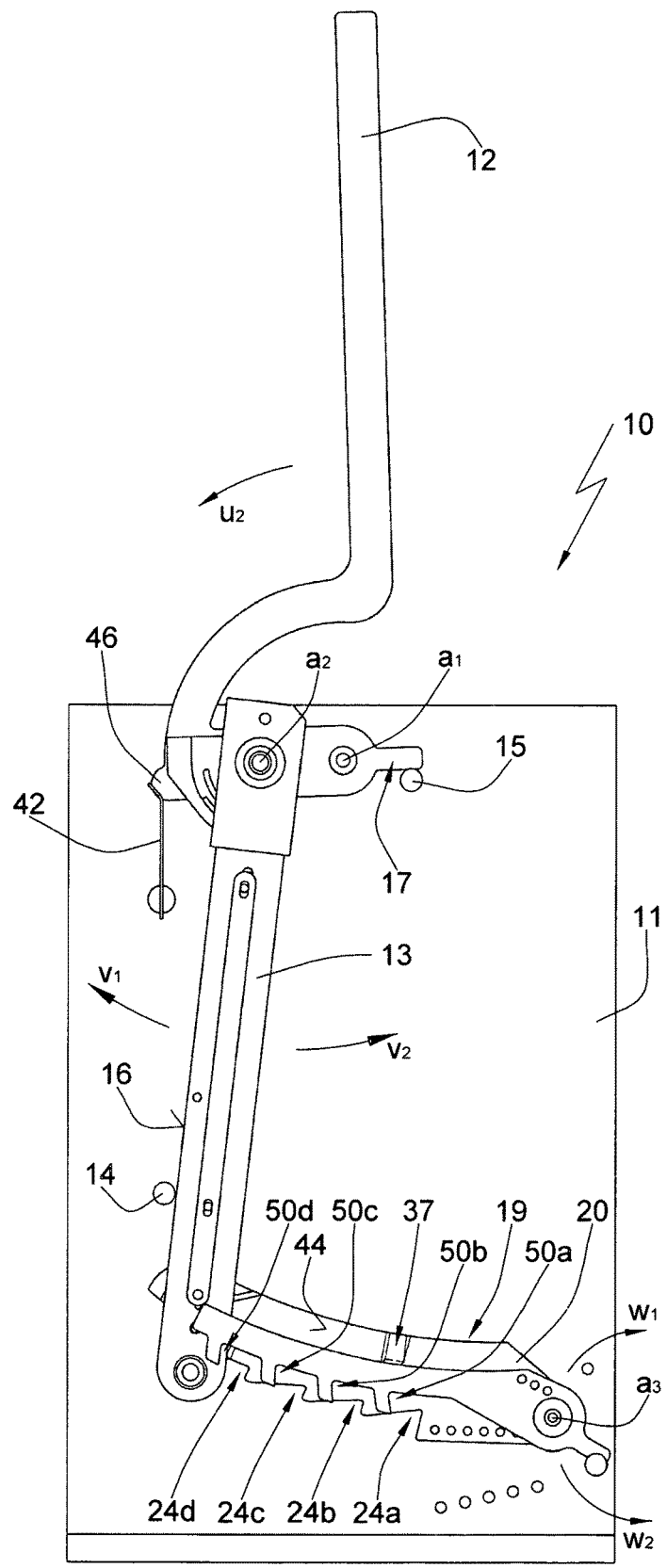
FIG. 8 is a side view of the armrest with the support arm pivoted relative to that of FIG. 7 in the direction u1 into an upper end position.

Pivoting of the lever 13 is limited relative to the base 11 by a first stop 14 fixed to the base 11. If an outer edge 16 of the lever 13 engages the first stop 14, the lever 13 has reached one end position. Pivoting of the support arm 12 in the upward direction $u_1$ relative to the base 11 is limited by a second stop 15. Thus, as shown in FIG. 8, a stop formation 17 of the support arm 12 lies against the second stop 15. Pivoting of the support arm 12 could also be limited in the downward direction $u_2$ relative to the base 11 by a stop in an alternative unillustrated embodiment.

In the upper end position, a radially projecting part 46 of the support arm 12 engages a spring 42, thereby stably holding the support arm 12 in the upper end position. By overcoming the force of the lock spring 42, the support arm 12 can be pivoted in the direction $u_2$.

Figure 1:
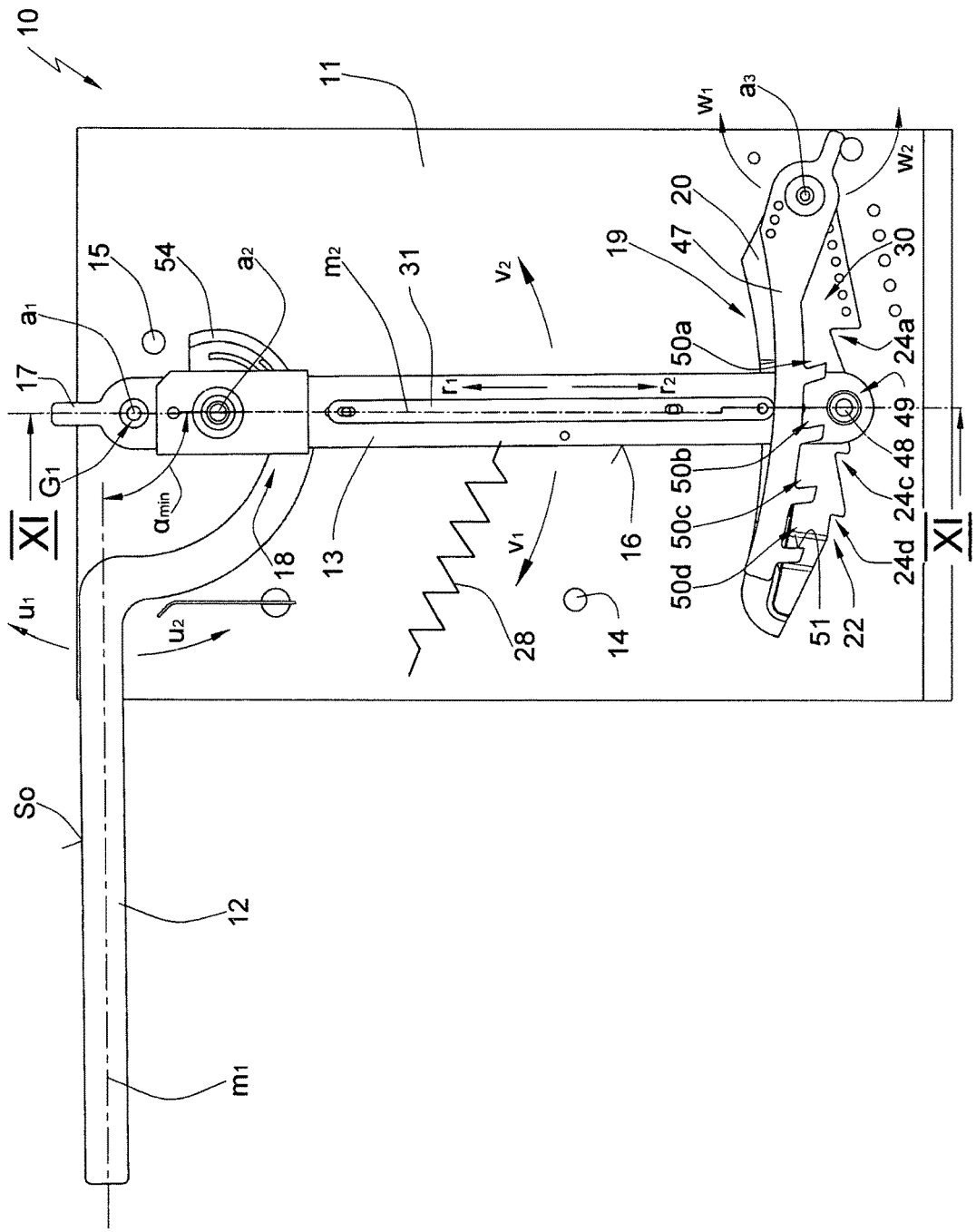
FIG. 1 is a side view of the armrest according to the invention in which a support arm is in an approximately horizontal use position and a memory device is in the freeing position, FIG. 2, like FIG. 1, is a side view of the armrest in which a lever of the latch and a retaining arm of the memory device are not illustrated for clarity of view.
Figure 3:
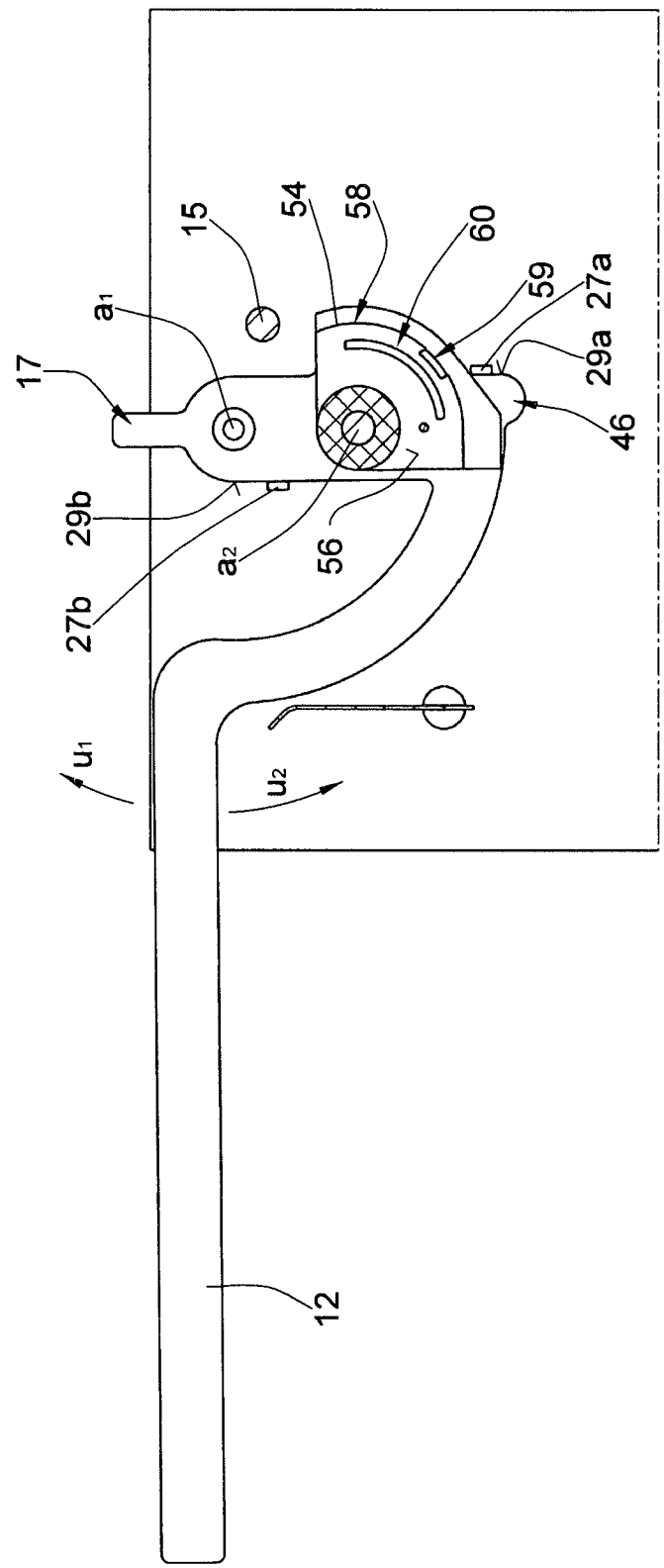
FIG. 3 is a detail view taken of the structure shown at III in FIG. 2.

Moreover, pivoting of the lever 13 is restricted relative to the support arm 12 by a limiting structure 18 formed here by third stops 27a and 27b (FIG. 3) on or attached to the lever 13. The third stops 27a and get 27b cooperate with counter-stops 29a and 29b of the support arm 12. In this way, the lever 13 can only move relative to the support arm 12 in a limited range of an angle α formed between a centerline $m_1$ of the support arm 12 and a centerline $m_2$ of the lever 13. The minimum angle $α_{min}$—e.g. approximately a right angle—is shown in FIG. 1. In the FIG. 1 use position, the support arm 12 is braced against the lever 13 by the stops 27a and 27b in the downward direction $u_2$. The lever 13 is biased in the outward direction $v_1$ by a tension spring 28 secured between the lever 13 and to the base 11.

Figure 4:
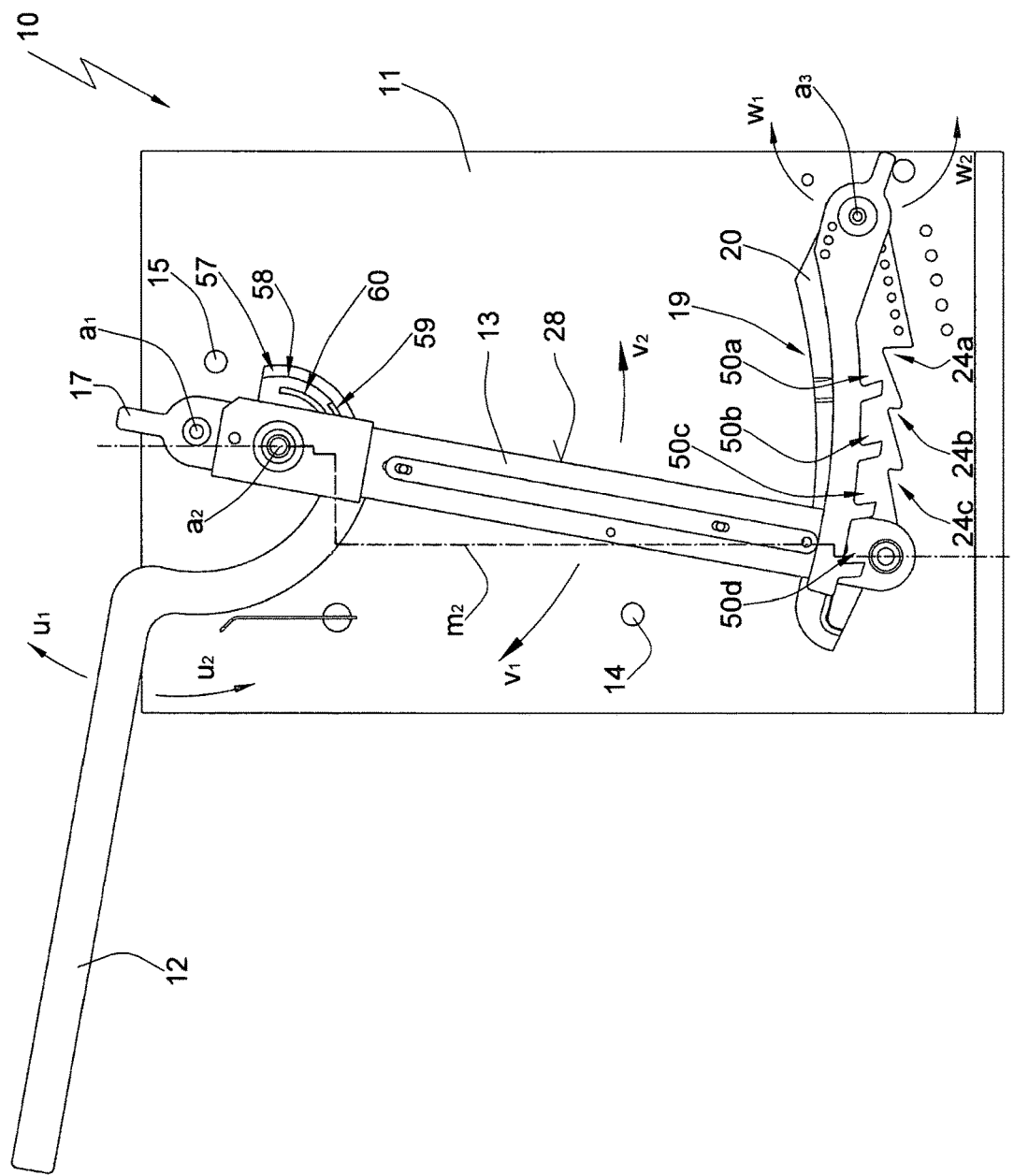
FIG. 4 is a side view of the armrest with the support arm in the uppermost use position.
Figure 11:
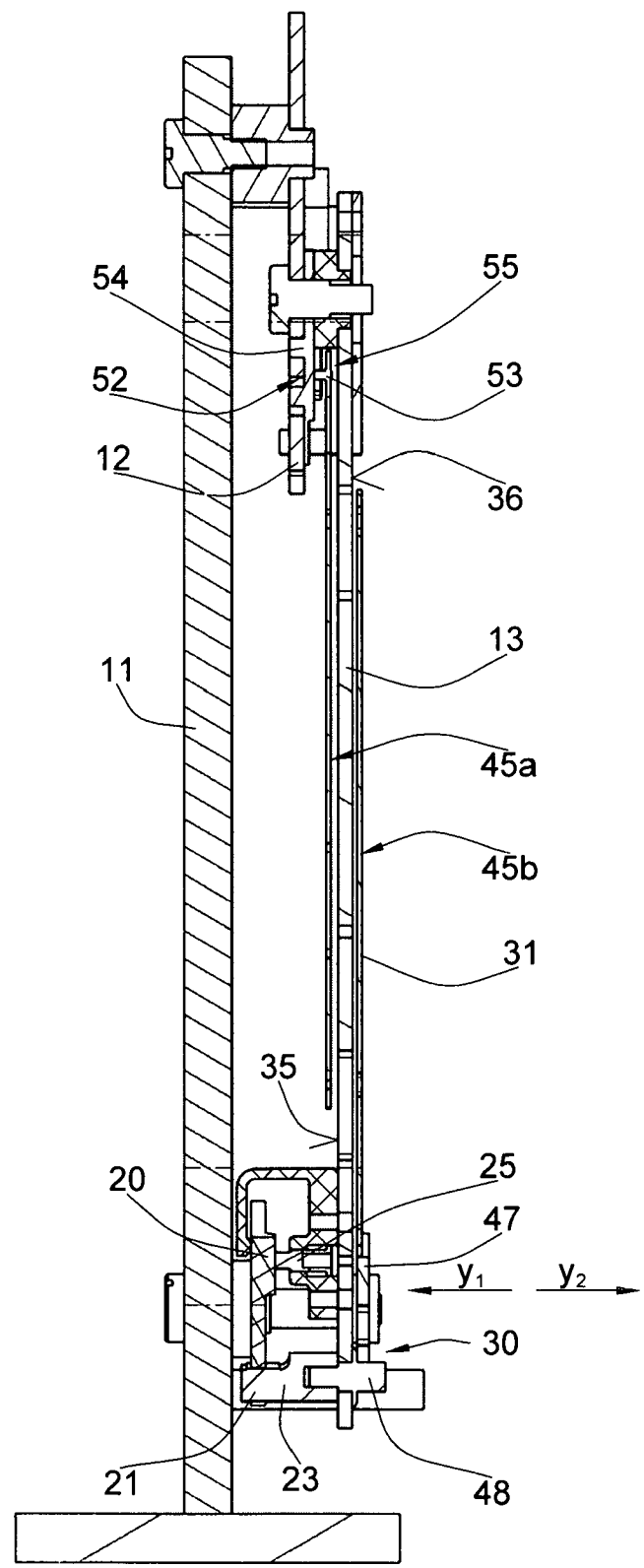
FIG. 11 is a section taken along line XI-XI in FIG. 1.

A latch 19 can move between a locking position and a release position to lock the support arm 12 in different positions. The latch 19 forms a one-way coupling that, when in the locked position (see, for example FIGS. 1 and 4), allows pivoting of the support arm 12 out of the respective position in the upward direction $u_1$, but prohibits pivoting in the downward direction $u_2$. The latch 19 comprises a lock arm 20, the lever 13, a first latch formation 21 (see FIG. 11) that here is a pin 23 (FIG. 11), and a second latch formation 22 that here is formed by sawtooth notches 24a, 24b 24c and 24d of the lock arm 20. The pin 23 is fixed on the lever 13. It projects from an inner face 35 of the lever 13.

Figure 5:
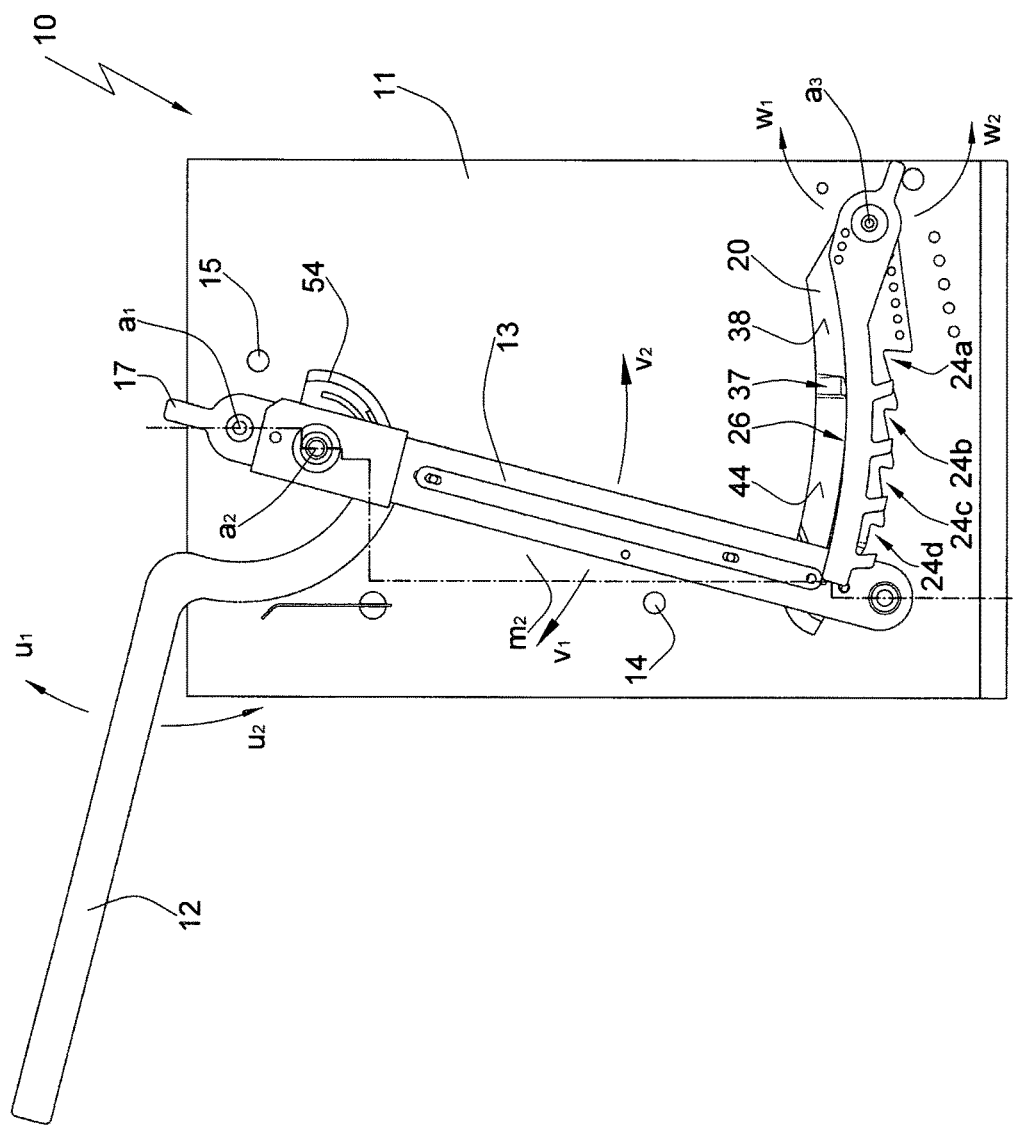
FIG. 5 is a side view of the armrest with the support arm in a position pivoted relative to that of FIG. 4 in a direction u1 and the latch in the release position.

The lock arm 20 pivots on the base 11 about a pivot axis $a_3$ in directions $w_1$ and $w_2$. The lock arm 20 is biased in the pivot direction $w_2$ by an unillustrated spring. The notches 24a to 24d each have a steep flank 33 and a shallow flank 34. The steep flanks 33 block, in the locking position of the latch, movement of the lever 13 in the inward direction $v_2$, while the shallow flanks 34 allow movement of the lever 13 in the outward direction $v_1$. In this manner, the latch 19 acts as a one-way coupling as long as the pin 23 (first latch formation) is engaged with the second latch formation 22 (the sawteeth 24a-d). The pin 23 can be disengaged from the second latch formation 22 by pivoting the locking arm 20 upward $w_1$ into the position shown in FIG. 5. In FIG. 5, the second latch formation 22 is in the release position.

Figure 2:
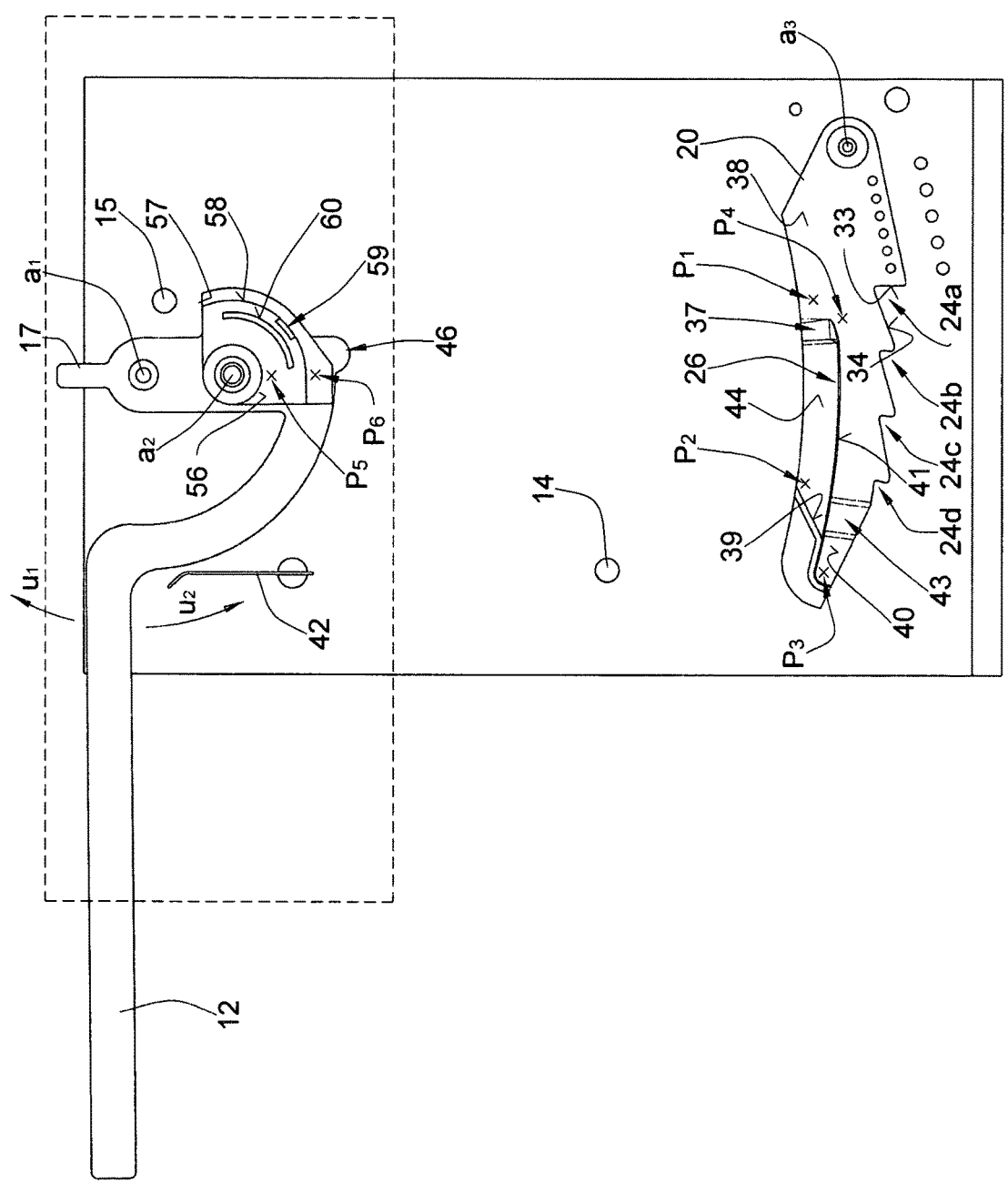
Figure 6:
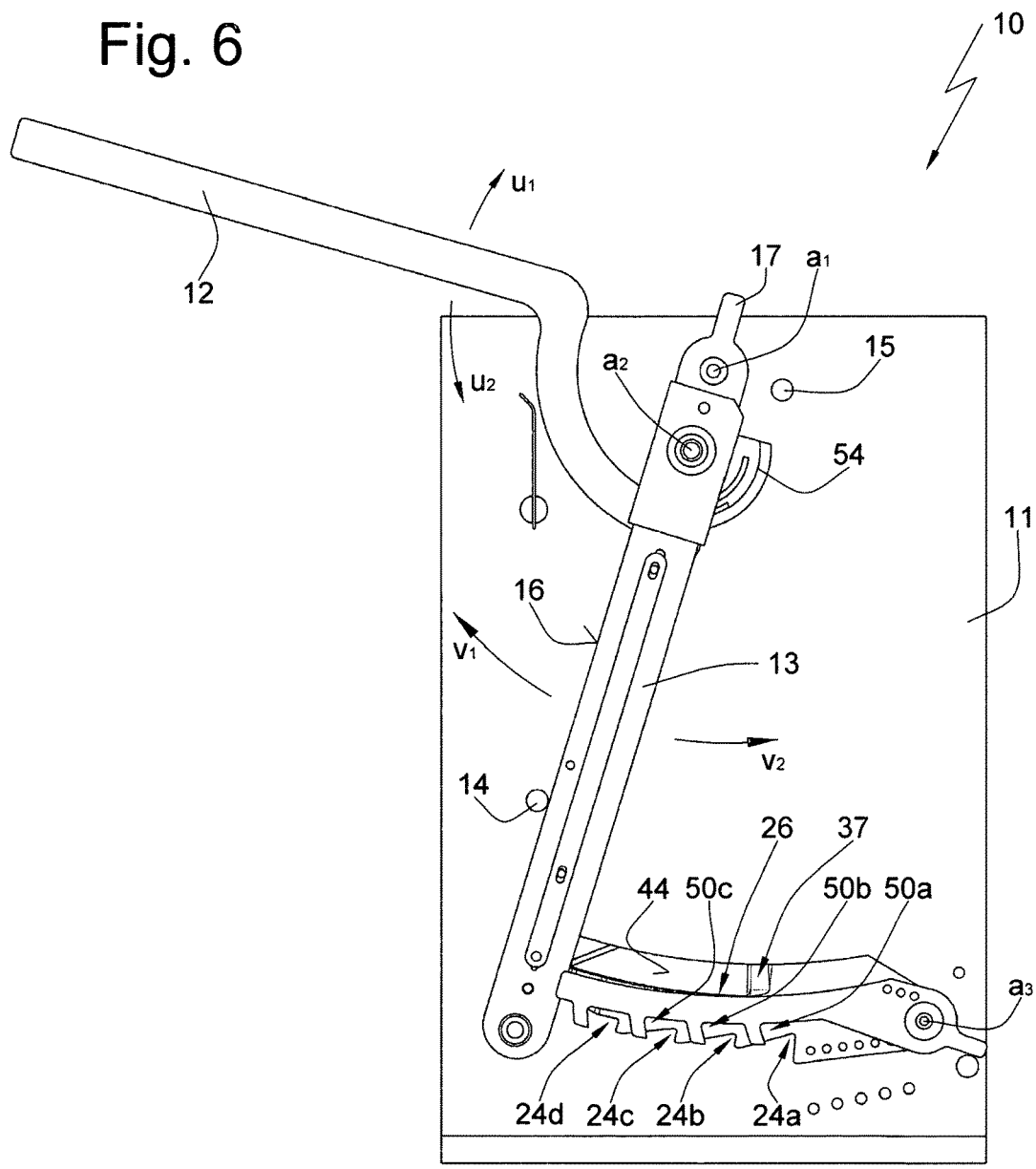
FIG. 6 is a side view of the armrest with the support arm in a position pivoted in the direction u1 relative to that of FIG. 5, and the lever resting on a first stop.
Figure 7:
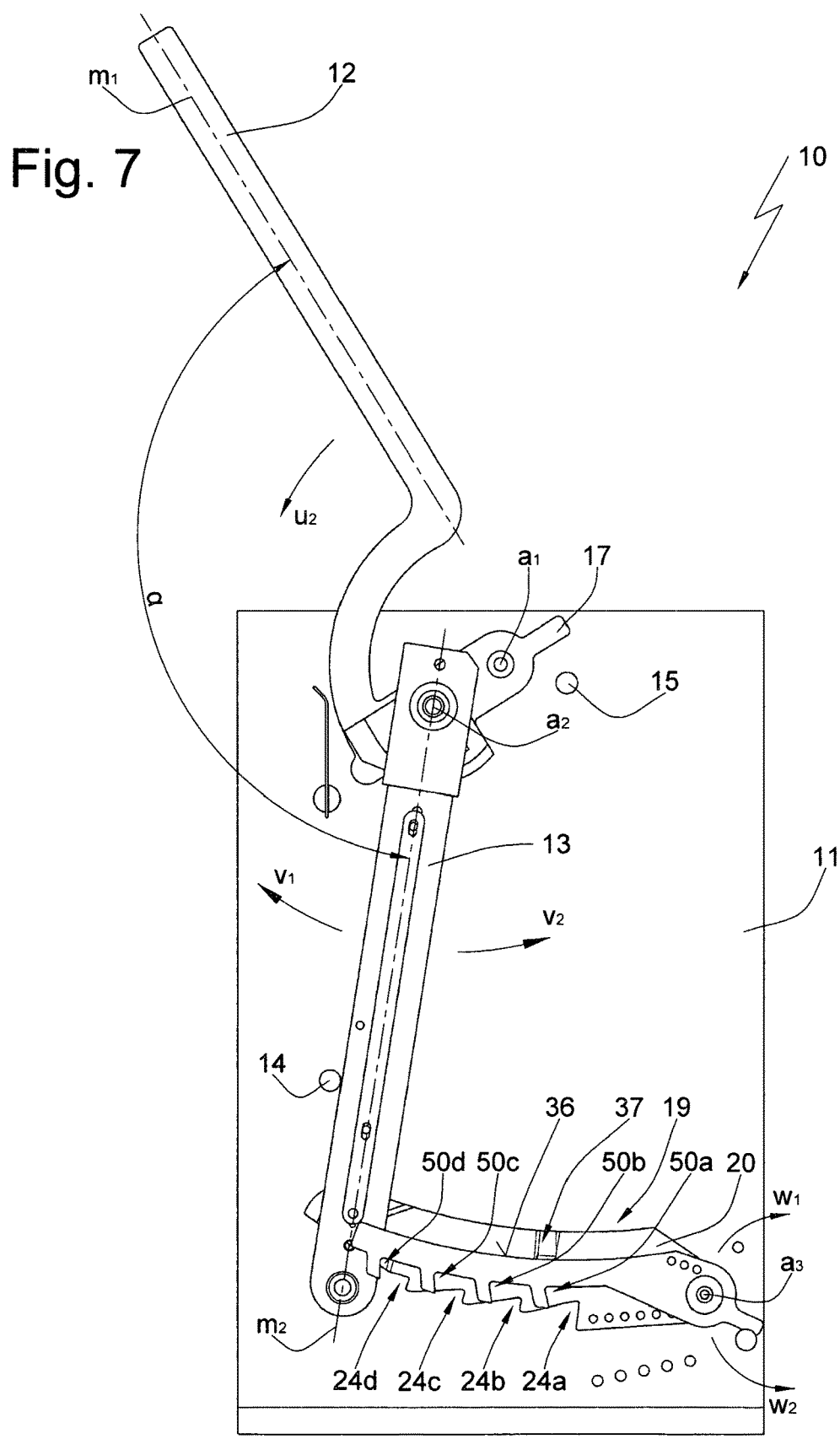
FIG. 7 is a side view of the armrest with the support arm in a position pivoted relative to that of FIG. 6 in the direction u1.

A control pin 25 carried on the lever 13 (see FIG. 11) projects from the inner face 35 of the lever 13 and engages a control structure 26 of the lock arm 20 (see FIG. 2). The control pin 25 is movable in directions $y_1$ and $y_2$, and is spring-loaded in the direction $y_1$ into contact with the control structure 26. If the support arm 12 is in the lowest lower end position, the pin 23 is engaged in the recess 24a and the control pin 25, in position $P_1$ (see FIG. 2), is in contact with an outer face 38 of the locking arm 20. If the support arm 12 is pivoted upward in the direction $u_1$, the lever 13 also moves in the upward direction $u_1$ because the spring 28 biases the lever 13 in this direction $u_1$. The pin 23 is moved in this case with ratcheting along the sawteeth 24a-d of the second latch formation 22. The control pin 25 moves over a ramp 37 onto an outer face 44 above the outer surface 38. When the pin 23 is in the recess 24d, the control pin 25 is in the position $P_2$. Further movement of the support arm 12 in the direction $u_1$ (see FIG. 5), moves the lever 13 in the direction $v_1$ until it comes to rest against the first stop 14 as shown in FIG. 6.

The control pin 25 in this case engages a guide edge 39 of the structure 26. Movement of the control pin 25 in the outward direction $v_1$ pivots the lock arm 20 in the upward direction $w_1$ until the control pin 25 comes to rest on an outer face 40. When the lever 13 is in contact with the first stop 14, the control pin 15 is in position $P_3$ in contact with the outer face 40 and with a guide edge 41 extending transversely of the outer face 40. Due to contact of the control pin 25 with the guide edge 41, the lock arm 20 cannot pivot back in the downward direction $w_2$, and the pin 23 of the first latch formation 21 is kept out of engagement with the second latch formation 22. The latch 19 is then in the release position.

On downward movement of the support arm 12 in the direction $u_2$, the lever 13 is entrained via the third stops 27a and 27b and pivoted against the force of the spring 28 in the inward direction $v_2$. The control pin 25 in this case moves along the guide edge 41. The control pin 25 again engages the outer surface 38 at point $P_4$ via a ramp 43. Shortly before reaching the lower end position of the support arm 12, the control pin 25 moves out of contact with the guide edge 41 so that the lock arm 20 can pivot in the direction $w_2$ and the pin 23 engages the recess 24a of the second latch formation 22 and the control pin 25 moves into the position $P_1$. The latch 19 is then in the locked position.

The support arm 12 and the lever 13 have, when the support arm 12 is pivoted in the direction $u_1$, the same relative position to each other until the lever 13 engages against the first stop 14. On further upward movement of the support arm 12 in the direction $u_1$, the relative position between the support arm 12 and lever 13 changes such that the angle α increases. The support arm 12 can, as mentioned above, be moved in the direction $u_1$ into the upper end position in which the stop formation 17 lies against the second stop 15 (see FIG. 8). The support arm 12 can be moved out of the upper end position in the direction $u_2$ directly into the lowermost end position when the memory function is not activated as explained below.

Figure 9:
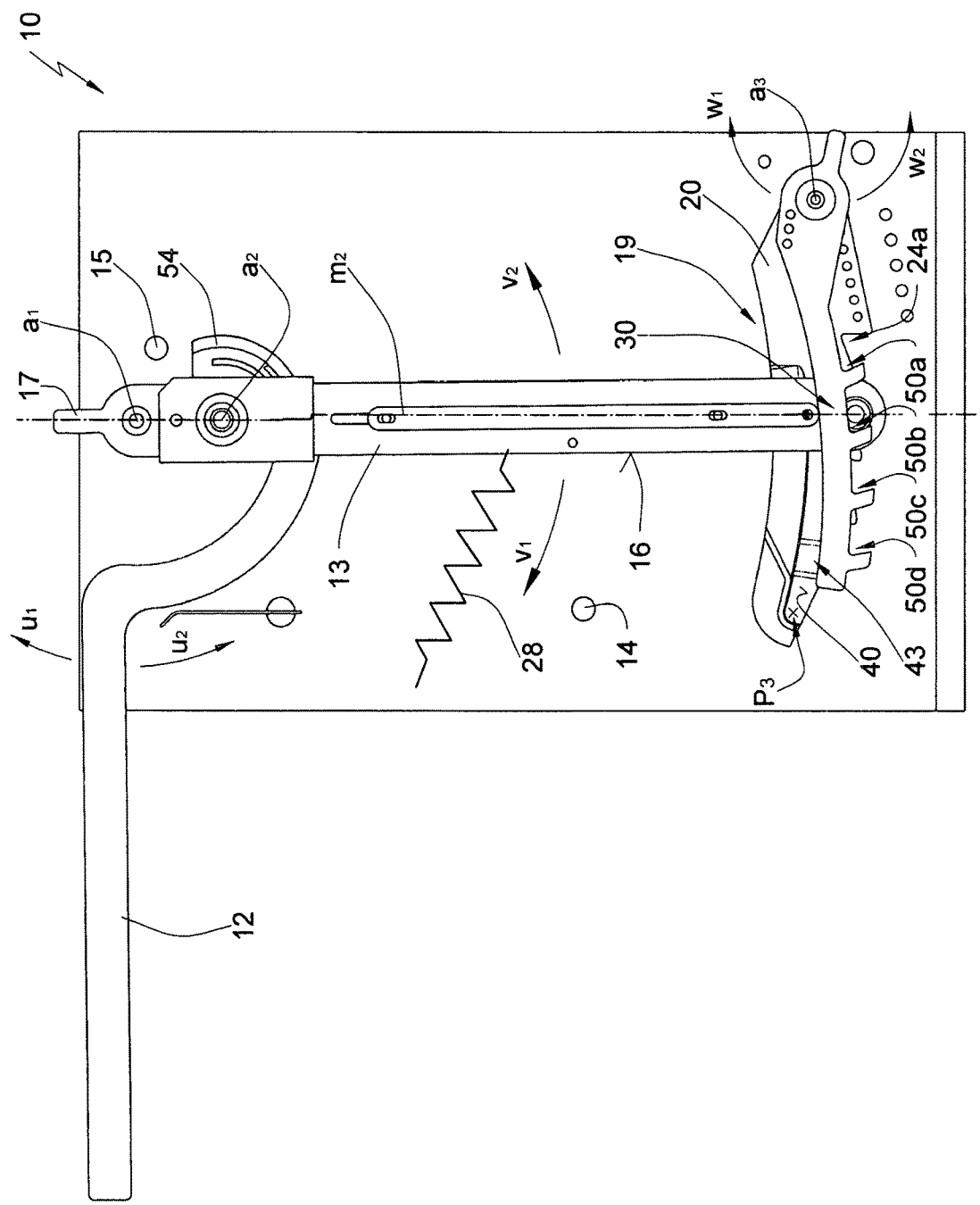
FIG. 9 is a side view of the armrest with the support arm in the position of FIG. 1 and the memory device in the holding position.
Figure 10:
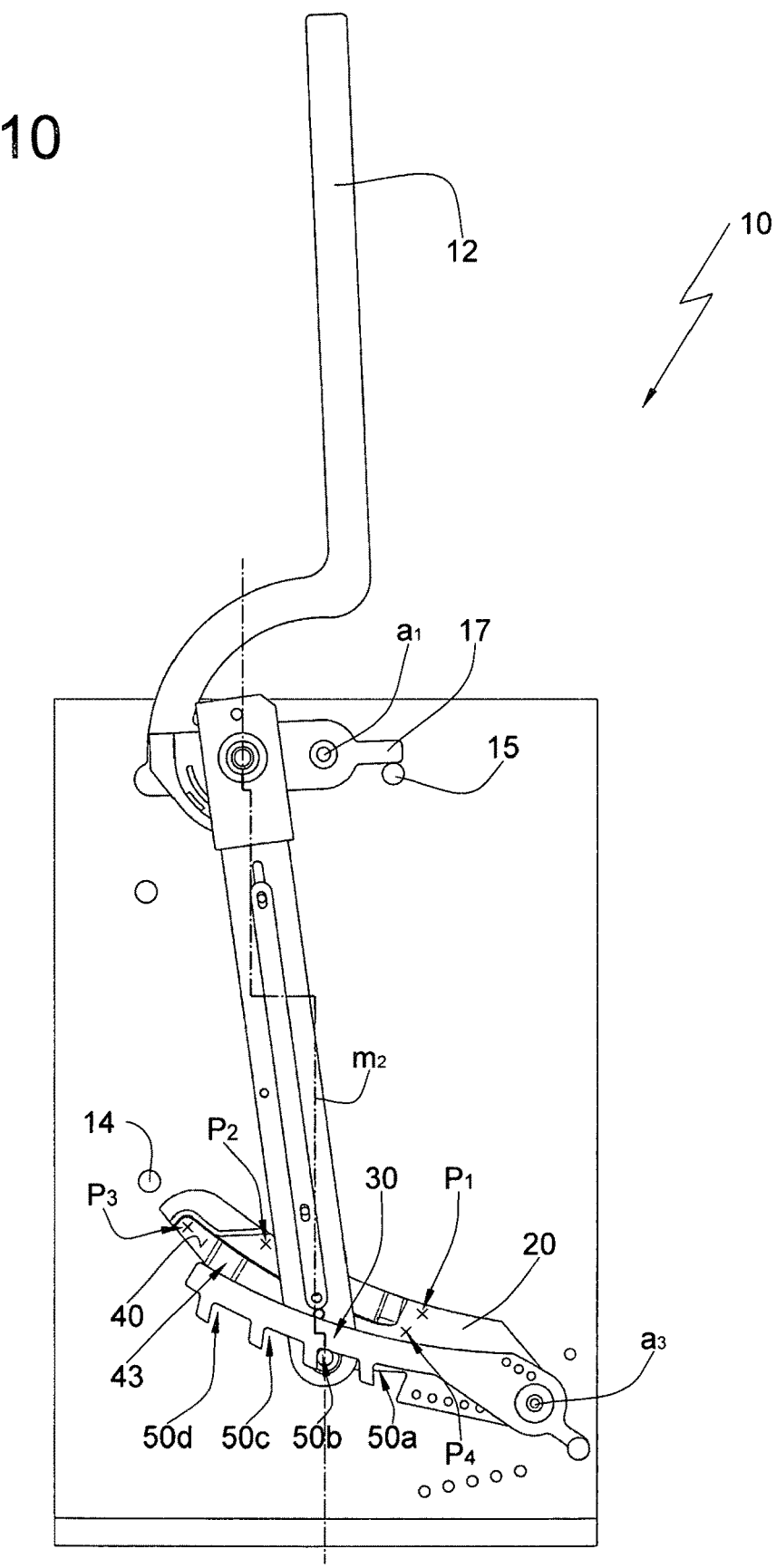
FIG. 10 is a side view of the armrest in which the support arm is in the upper end position and the memory device is in the holding position.

The armrest includes a memory device 30 movable between a holding position and a freeing position. The memory device can be actuated by an unillustrated handle. The unillustrated handle is connected in a manner not shown to a slider 31 that can move in the directions $r_1$ and $r_2$ between an upper position shown in FIG. 1 and a lower position shown in FIG. 9. In the freeing position, the slider 31 is in the upper position, and in the holding position the slider 31 is in the lower position. The slider 31 extends along the central axis $m_2$ of the lever 13 and comprises a first part 45a that moves on the inner arm face 35 and a second part 45b that is on an outer arm face 36. The parts 45a and 45b are connected to each other and therefore move jointly in the same direction $r_1$ or $r_2$.

In the non-actuated position of the memory device 30, the slider 31 assumes the upper position in FIG. 1. In the lower actuated position of the memory device 30, the slider 31 is in the position in FIG. 9. Actuation of the memory device 30 moves the slider 31 upward in the direction $r_1$. A retaining arm 47 pivotal in the directions $w_1$ and $w_2$ about the pivot axis $a_3$ is spring-loaded in the upward direction $w_1$. If the slider 31 is moved from the upper position to the lower position, the second part 45b of the slider 31 pivots the retaining arm 47 downward against the spring force in the direction $w_2$.

In this case, the retaining arm 47 is moved into engagement with a pin 48 fixed to the lower arm end 49 on the outer face 36 of the lever 13 and holds the lever 13 in its set lower end position. The retaining arm 31 has a plurality of notches 50a, 50b, 50c and 50d each forming a retaining surface 51. If one of the notches 50a to 50d is in engagement with the pin 48, the retaining surface 51 limits the degree of pivotal freedom of the lever 13, such that relative movement between the lever 13 and the support arm 12 can occur. When the memory device 30 is actuated, the support arm 12 can therefore move relative to the lever 13, for example such that the pivot angle α increases.

A controller 52 of the memory device 30 holds the retaining arm 47 by the slider 31 in the actuated position. The support arm 12 can then be moved into the upper position without the pin 23 being moved out of the respective recess 24a, 24b, 24c or 24d. The memory device 30 remains in the locked lower position until the support arm 12 is pivoted by a predetermined angle α in the direction $u_1$, and back in the direction $u_2$ toward the starting position. Thereafter, the memory device 30 can automatically move into the unactuated position such that the slider 31 moves in the direction $r_2$ and releases the retaining arm 47, and it can pivot in the direction $w_1$ out of engagement with the pin 23 under the force of its spring.

The controller 52 includes an actuating pin 53—for example fixed to an upper end 55 of the first part 45 and urged by a spring in the direction y in contact with a cam 54 fixed to the support arm 12. The cam 54 is shown in FIG. 2. If the memory device 30 is not actuated, the actuating pin 53 stays in the upper position shown in FIG. 2. If the support formation 12 is approximately in the horizontal position as in FIG. 1, then the pin 23 is in the second recess 24b and the actuating pin 53 is in position $P_5$ relative to the cam 54.

The actuation of the memory device 30 has the result that the slider 31 moves radially in the direction $r_1$. The actuating pin 53 is moved in this case from a first surface 56 of the cam 54 onto a second surface 57 and into position $P_6$ that has a lower level than the first surface 56 and is separated by a guide surface 58 from the first surface 56. The guide surface 58 is arranged transverse to the second surface 57. The guide surface 58 forms a contact surface that can no longer be passed by the actuating pin 53 in the direction $r_2$. The slider 31 is thus held in the lower position.

Only when the support arm 12 is pivoted with the cam 54 by a predetermined angular spacing in the direction $u_1$ does a ramp 59 of the cam 54 move in front of the actuating pin 53 in such a manner that it can move back in the direction $r_2$ onto the first surface 56 until it engages a circularly arcuate guide surface 60.

The guide surface 60 prevents movement of the memory device into the unactuated position until the support arm 12 has reached its starting position relative to the lever 13, in which the memory device 30 has been actuated. Then, the lock pin 53 can move left past the guide surface 60 in the direction $r_2$ such that the slider 31 connected to the actuating pin 53 also moves back in the direction $r_2$ into the unactuated position. The retaining arm 20 is now moved out of engagement with the control pin by the unillustrated spring in the direction $u_1$. This has the consequence that the lever 13 once more moves in the direction $v_1$ until coming to lie against the first stop 14, if the support arm 12 is pivoted in the direction $u_1$.

The invention claimed is:

1. An armrest comprising:
    a base;
    an arm pivotal on the base about an arm axis in a first direction from a use position that is generally horizontal through an intermediate position to a nonuse position that is generally vertical and in a second direction opposite the first direction from the nonuse position to the use position;
    a lever pivotal on the base or on the arm in the first direction and in the second direction about a lever axis parallel to the arm axis;
    a stop on the lever and engageable with the arm for joint movement of the lever with the arm in the first direction from the use position of the arm to the intermediate position;
    a strike on the base and engageable by the lever on movement in the first direction into the intermediate position, the strike blocking movement of the lever in the first direction past the intermediate position when engaged with the lever;
    a latch for latching the lever in different pivot positions between the use position and the intermediate position and thereby resetting the use position of the arm, the latch including
    a first formation on the lever; and
    a second formation on the base and engageable with the first formation, the first and second formations being relatively movable toward and away from each other between a release position permitting movement of the lever in the first and second directions and a locking position blocking movement of the lever in the second direction and allowing movement of the lever in the first direction; and
    a spring urging the lever in the first direction and thereby urging the stop on the lever against the arm such that the lever pivots with the arm in the first direction until, in the intermediate position, the lever engages against the strike and stops, leaving the arm free to separate from the stop of the lever and pivot further in the first direction to the nonuse position, thereby moving the first formation relative to the second latch formation.

2. The armrest according to claim 1, wherein a pivot pivotally supports the lever on the arm.

3. The armrest according to claim 1, wherein the first formation or the second formation is formed by a tooth structure having retaining surfaces.

4. The armrest according to claim 1, wherein the second formation has a locking formation mounted in a manner allowing movement.

5. The armrest according to claim 1, further comprising:
    a controller for moving the first formation or the second formation out of engagement or into mutual engagement according to relative positions thereof.

6. The armrest according to claim 1, further comprising:
    a memory device movable between a holding position and a freeing position, the lever being blocked in the holding position in a selected one of the pivot positions, the lever not being blocked in the freeing position.

7. The armrest according to claim 6, wherein the memory device comprises a controller that holds the memory device in the selected one of the locking positions after actuation until the arm has executed a predetermined movement process.

* * * * *